United States Patent
Kim et al.

(10) Patent No.: US 11,598,646 B2
(45) Date of Patent: Mar. 7, 2023

(54) APPARATUS AND METHOD FOR PROVIDING TRAFFIC INFORMATION

(71) Applicants: Hyundai Motor Company, Seoul (KR); Kia Motors Corporation, Seoul (KR); Industry-University Cooperation Foundation Hanyang University, Seoul (KR)

(72) Inventors: Tae Heon Kim, Gyeonggi-do (KR); Nam Hyuk Kim, Seoul (KR); Sang-Wook Kim, Seoul (KR); Junho Song, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 247 days.

(21) Appl. No.: 17/034,070

(22) Filed: Sep. 28, 2020

(65) Prior Publication Data
US 2022/0003567 A1   Jan. 6, 2022

(30) Foreign Application Priority Data
Jul. 1, 2020   (KR) .................. 10-2020-0081142

(51) Int. Cl.
*G01C 21/00*   (2006.01)
*G01C 21/36*   (2006.01)
(Continued)

(52) U.S. Cl.
CPC ..... *G01C 21/3691* (2013.01); *G01C 21/3446* (2013.01); *G01C 21/3492* (2013.01);
(Continued)

(58) Field of Classification Search
CPC ............ G01C 21/3691; G01C 21/3446; G01C 21/3492; G06K 9/6256; G06N 3/04; G08G 1/0125
(Continued)

(56) References Cited

U.S. PATENT DOCUMENTS

2008/0071465 A1* 3/2008 Chapman ............. G08G 1/0104
                                                         701/117
2012/0072096 A1* 3/2012 Chapman ............. G08G 1/0133
                                                         701/117

OTHER PUBLICATIONS

Jing Bai and Yehua Chen, "A Deep Neural Network Based on Classification of Traffic Volume for Short-Term Forecasting," Oct. 9, 2018, Hindawi Mathematical Problems in Engineering, Whole Document. (Year: 2018).*

* cited by examiner

*Primary Examiner* — Tyler J Lee
*Assistant Examiner* — Tiffany P Ohman
(74) *Attorney, Agent, or Firm* — Fox Rothschild LLP (57) ABSTRACT

An apparatus and a method for providing traffic information are provided. The apparatus includes a traffic data database (DB) that stores traffic data and a processor connected to the traffic data DB. The processor generates a prediction model to predict a traffic flow and determines an appropriate data input range for a target time point in the future using the prediction model. Additionally, the processor extracts past traffic data from the traffic data DB based on the determined appropriate data input range, predicts a traffic flow at the target time point based on the extracted past traffic data and provides the predicted traffic flow as traffic information.

11 Claims, 9 Drawing Sheets

(51) Int. Cl.
  *G01C 21/34* (2006.01)
  *G06N 3/04* (2023.01)
  *G08G 1/01* (2006.01)
  *G06K 9/62* (2022.01)
(52) U.S. Cl.
  CPC ............. *G06K 9/6256* (2013.01); *G06N 3/04* (2013.01); *G08G 1/0125* (2013.01)
(58) Field of Classification Search
  USPC ........................................................ 701/532
  See application file for complete search history.

APPARATUS AND METHOD FOR PROVIDING TRAFFIC INFORMATION

CROSS-REFERENCE TO RELATED APPLICATION

This application claims the benefit of priority to Korean Patent Application No. 10-2020-0081142, filed on Jul. 1, 2020, the entire contents of which are incorporated herein by reference.

TECHNICAL YIELD

The present disclosure relates to an apparatus and a method for providing traffic information, and more particularly, to an apparatus and method for providing traffic information which determine a data range to be used using a deep learning-based prediction model.

BACKGROUND

A traffic information providing system may collect traffic information using a radar detector, a video detector, a DSRC (Dedicated Short Range Communication) device, a CCTV (Closed Circuit Television), and a RWIS (Road Weather Information System), or the like and provide real-time traffic information and predicted traffic information at a future time point based on the predicted traffic information. In addition, the traffic information providing system may collect GPS (Global Positioning System) data of vehicles traveling on a road, and provide real-time traffic information and predicted traffic information at a future time point to a user based on the collected traffic information.

As traffic information predicting methods, various methods such as time series prediction, statistical prediction, and machine learning-based prediction have been proposed. Recently, a methodology utilizing deep learning has been actively developed. Deep learning is a technique capable of effectively predicting nonlinear data and is effective in predicting traffic information, but different results are derived based on data ranges used when predicting traffic information. However, in the past, when predicting traffic information, a data range that is used heuristically is determined and data of the same range is used irrespective of the prediction time point, so the performance of the prediction model is unable to be maximized.

SUMMARY

The present disclosure provides an apparatus and a method for providing traffic information which determine a data range to be used using a deep learning-based prediction model and predicting and providing traffic information at a future time point using past traffic data of the determined data range.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for providing traffic information may include a traffic data database (DB) configured to store traffic data, and a processor connected to the traffic data DB, and the processor may be configured to generate a prediction model for predicting a traffic flow, determine an appropriate data input range for a target time point in the future using the prediction model, extract past traffic data from the traffic data DB based on the determined appropriate data input range, predict a traffic flow at the target time point based on the extracted past traffic data and provide the predicted traffic flow as traffic information.

The processor may be configured to build the prediction model by training a regression model of a deep neural network (DNN) structure. The processor may be configured to predict a travel speed at the target time point by analyzing past travel speed data for each data input range using the prediction model, calculate a relative error between the predicted travel speed and an actually measured travel speed to analyze a prediction accuracy of each data input range, and calculate the appropriate data input range according to a result of the prediction accuracy analysis.

The data input range may be set in advance to a time interval from a reference time point to a specific time point in the past. The processor may be configured to subdivide a road section according to spatial characteristics and calculate an appropriate data input range for each road section. The traffic data DB may include pieces of travel speed data for each time point and each road section which are measured in the past with respect to a present time point. The processor may further consider external environment information when the traffic flow is predicted.

According to an aspect of the present disclosure, a method for providing traffic information may include generating a prediction model for predicting a traffic flow, determining an appropriate data input range for a target time point in the future using the prediction model, extracting past traffic data from a traffic data database (DB) based on the determined appropriate data input range, and predicting a traffic flow at the target time point based on the extracted past traffic data and providing the predicted traffic flow as traffic information.

The generating of the prediction model may include building the prediction model by training a regression model of a deep neural network (DNN) structure. The determining of the appropriate data input range may include predicting a travel speed at the target time point by analyzing past speed data for each data input range using the prediction model, analyzing a prediction accuracy for each data input range by calculating a relative error between the predicted travel speed and the measured travel speed, and calculating the appropriate data input range according to a result of the prediction accuracy analysis.

The data input range may be set in advance to a time interval from a reference time point to a specific time point in the past. The calculating of the appropriate data input range may include subdividing a road section according to spatial characteristics and calculating an appropriate data input range for each road section. The providing of the traffic information may include predicting the traffic flow based on external environment information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
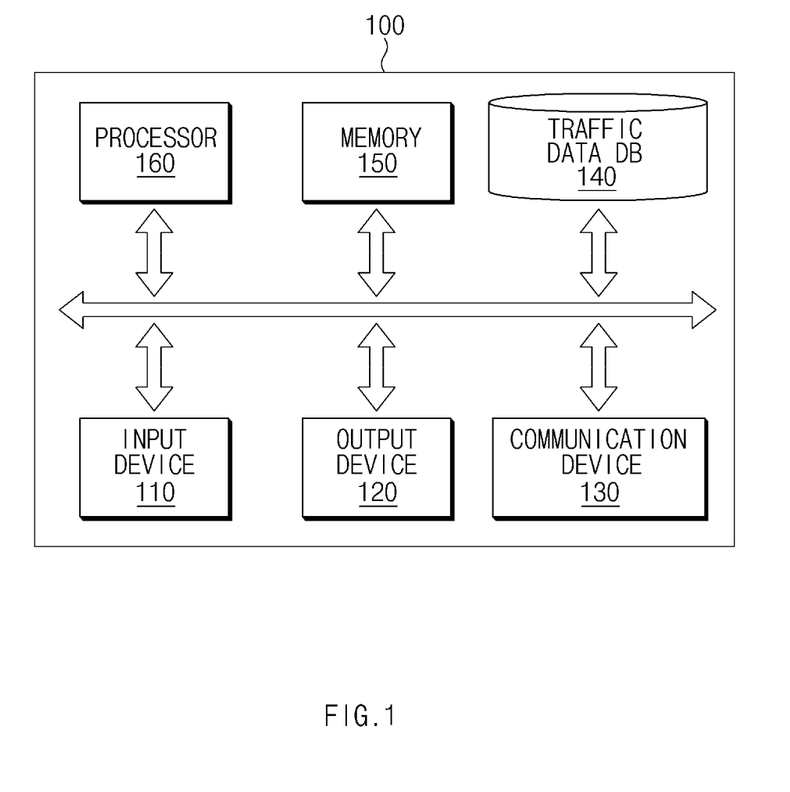
FIG. 1 is a block configuration diagram illustrating an apparatus for providing traffic information according to an exemplary embodiment of the present disclosure.

FIG. 1 is a block configuration diagram illustrating an apparatus for providing traffic information according to an exemplary embodiment of the present disclosure; Referring to FIG. 1, an apparatus for providing traffic information 100 may include an input device 110, an output device 120, a communication device 130, a traffic data database (DB) 140, a memory 150, and a processor 160.

The input device 110 may be a device for enabling input of data. The input device 110 may be implemented with at least one of input devices such as a key pad, a keyboard, a dome switch, a touch pad, and a touch screen. The output device 120 may be configured to output various types of information or data according to an operation of the processor 160 in the form of visual information and/or audible information. The output device 120 may include a display device such as a liquid crystal display (LCD), a thin film transistor-liquid crystal display (TFT LCD), an organic light-emitting diode (OLED) display, a flexible display, a 3D display and/or a transparent display, and/or an audio output device such as a receiver, a speaker and/or a buzzer, and the like.

The communication device 130 may be configured to enable wired/wireless communication with other terminals via a network. The communication device 130 may use any one or more of communication technologies such as wireless Internet, mobile communication, and short-range communication. As the wireless Internet technology, wireless LAN (WLAN) (WiFi), wireless broadband (Wibro), and/or World Interoperability for Microwave Access (Wimax) may be used. The short-range communication technologies may include Bluetooth, Near Field Communication (NFC), Radio Frequency Identification (RFID), Infrared Data Association (IrDA), Ultra Wideband (UWB) and/or ZigBee and the like. As the mobile communication technology, at least one of communication technologies such as Code Division Multiple Access (CDMA), Global System for Mobile communication (GSM), Long Term Evolution (LTE), and/or LTE-Advanced may be used. The communication device 130 may include a communication processor (CP), a communication circuit, an antenna, and/or a transceiver.

The traffic data DB 140 may be implemented as a storage medium such as a hard disk that provides a mass storage function. The traffic data DB 140 may be implemented with various types of storage media, such as the memory 150 to be described later. In addition, the traffic data DB 140 may be implemented as a web storage that performs a storage function on the Internet. The traffic data DB 140 may be configured to store traffic data. The traffic data may include information (data) that affects a traffic flow, such as travel speeds for each time point (for each time zone) and for each road section, traffic volume, whether an accident has occurred, road condition and/or weather. The traffic data may include data at a present time point and/or data at a past time point with respect to the present time point.

The memory 150 may be a non-transitory storage medium that stores instructions to be executed by the processor 160. The memory 150 may be implemented with one or more of storage medium (recording medium) such as a hard disk, a solid state drive (SSD), a flash memory, a secure digital (SD) card, a random access memory (RAM), a read only memory (ROM), and an EEPROM (Electrically Erasable and Programmable ROM), EPROM (Erasable and Programmable ROM), registers, and a removable disk.

The processor 160 may be configured to execute an overall operation of the apparatus for providing traffic information 100. The processor 160 may be implemented with at least one of an application specific integrated circuit (ASIC), a digital signal processor (DSP), a programmable logic device (PLD), field programmable gate array (FPGAs), a central processing unit (CPU), microcontrollers, and microprocessors. The processor 160 may be configured to collect traffic data provided from a radar detector, a video detector, a Dedicated Short Range Communication (DSRC) device, a Closed Circuit Television (CCTV), a Road Weather Information System (RWIS), which are installed on a road, via the communication device 130. In addition, the processor 160 may be configured to collect traffic data measured by sensors mounted on a vehicle via the communication device 130. The processor 160 may be configured to store the collected traffic data in the traffic data DB 140.

Additionally, the processor 160 may be configured to build (generate) a model for predicting a traffic flow through deep learning, that is, a traffic flow prediction model (hereinafter, a prediction model). The processor 160 may be configured to build a prediction model by training a regression model with a deep neural network (DNN) structure. The deep neural network may include an input layer, five hidden layers, and an output layer, and use an activation function. As an activation function, a ReLU (Rectified Linear Unit) function may be used. In the case of training for building a prediction model, parameters of the regression model may be optimized using an objective function and an optimizer. In particular, a loss function MSE (Mean Square Error) may be used as the objective function, and an adaptive moment estimation (Adam) algorithm may be used as the optimizer.

The processor 160 may be configured to determine an appropriate data input range for a target time point in the future using the prediction model. The processor 160 may be configured to receive a target time point using the input device 110 or the communication device 130. In particular, the processor 160 may be configured to receive a target road section together with the target time point. The processor 160 may then be configured to predict a travel speed at the target time point by analyzing past speed data for each data input range using the prediction model. Additionally, the processor 160 may be configured to analyze a prediction accuracy for each data input range by calculating an error between the predicted travel speed and the measured travel speed. In other words, the processor 160 may be configured to analyze the prediction accuracy based on the input range of past traffic data. The processor 160 may be configured to determine an appropriate data input range based on a result of the prediction accuracy analysis.

In response to determining the appropriate data input range, the processor 160 may be configured to extract past traffic data from the traffic data DB 140 based on the determined appropriate data range. The processor 160 may be configured to predict a travel speed, that is, a traffic flow, at a target time point based on the extracted past traffic data. The processor 160 may then be configured to provide the predicted traffic flow to the user as traffic information. For example, the processor 160 may be configured to output the predicted traffic flow to the output device 120. In addition, the processor 160 may be configured to transmit the predicted traffic flow to a user terminal (e.g., a smartphone and/or tablet) and/or a vehicle terminal (e.g., a navigation terminal and/or an infotainment terminal) through the communication device 130.

Further, the processor 160 may be configured to subdivide road sections according to spatial characteristics and determine (e.g., calculate) an appropriate data input range for each road section. For example, the processor 160 may be configured to classify road sections into an uninterrupted flow road section and an interrupted flow road section, and calculate an appropriate data input range for each road section. Particularly, the uninterrupted flow road section may include a highway and an urban expressway, and the interrupted flow road section may include an urban road and a city street. The processor 160 may additionally be configured to consider external environment information when predicting a traffic flow at a target time point in the future. The external environment information may include weather, road conditions, and/or whether an accident has occurred.

Figure 2:
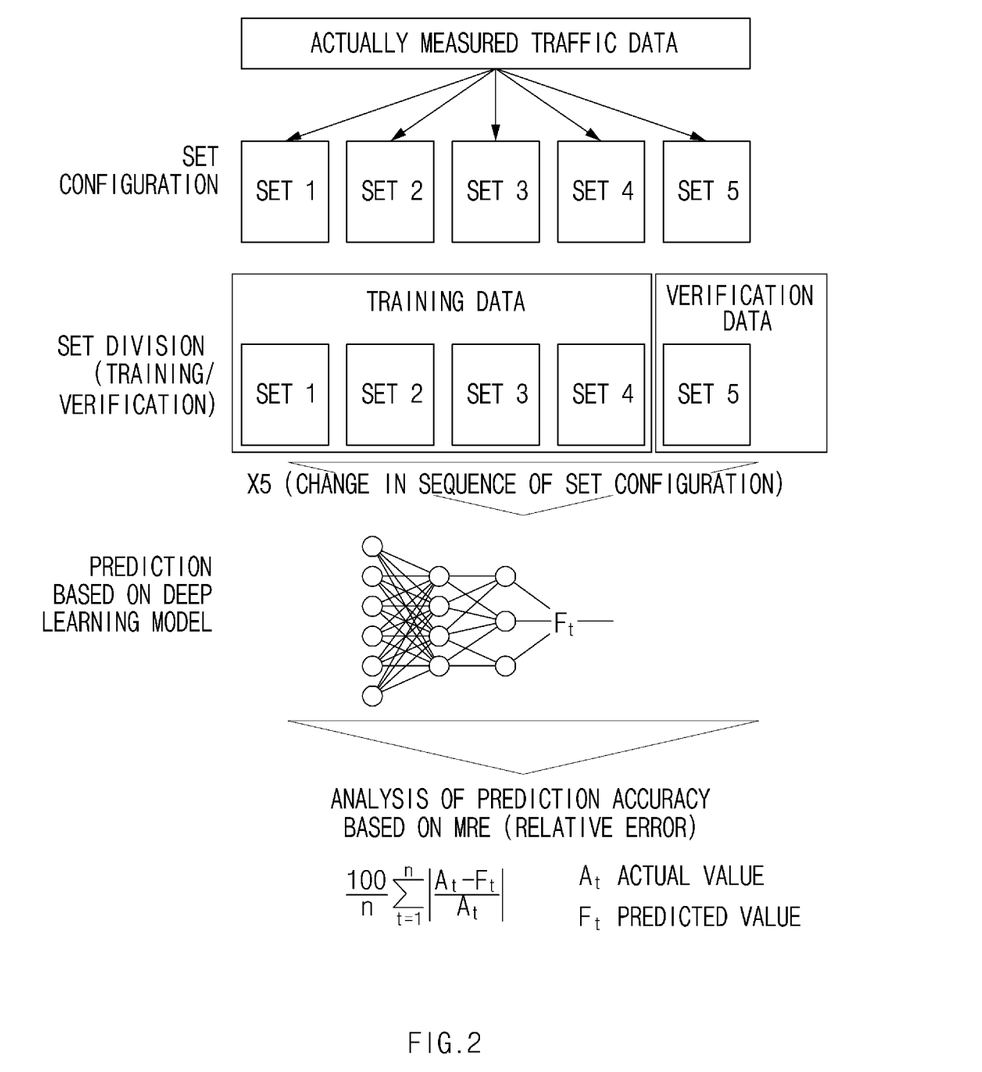
FIG. 2 is a diagram for describing a prediction accuracy analysis method according to an exemplary embodiment of the present disclosure.

FIG. 2 is a diagram for describing a prediction accuracy analysis method according to an exemplary embodiment of the present disclosure; The processor 160 may be configured to receive actually measured traffic data. The processor 160 may be configured to receive actually measured traffic data through the input device 110 or the communication device 130. Alternatively, the processor 160 may be configured to access actually measured traffic data in the traffic data DB 140. In particular, the actually measured traffic data may include travel speed data (e.g., past travel speed data) for each time (time point) and each road section, which are measured at a past time point. The processor 160 may be configured to classify the actually measured traffic data into a plurality of training data sets and verification data sets. The processor 160 may also be configured to classify the training data sets according to the data input range. For example, the processor 160 may be configured to classify pieces of travel speed data during the past 30 minutes, the past 60 minutes, the past 90 minutes, and the past 120 minutes with respect to the present time point into a first training data set, a second training data set, a third training data set and a fourth training data set But the present disclosure is not limited to such time periods.

The processor 160 may be configured to predict a travel speed at a specific target time point by analyzing each training data set using a prediction model. The processor 160 may be configured to calculate a relative error between the predicted travel speed and the actually measured travel speed at the target time point in the verification data set Additionally, the processor 160 may be configured to analyze an accuracy of the predicted travel speed for each training data set based on the calculated relative error. The processor 160 may be configured to determine a data input range of the training data set having a smallest relative error calculated as an appropriate data input range.

Figure 3:
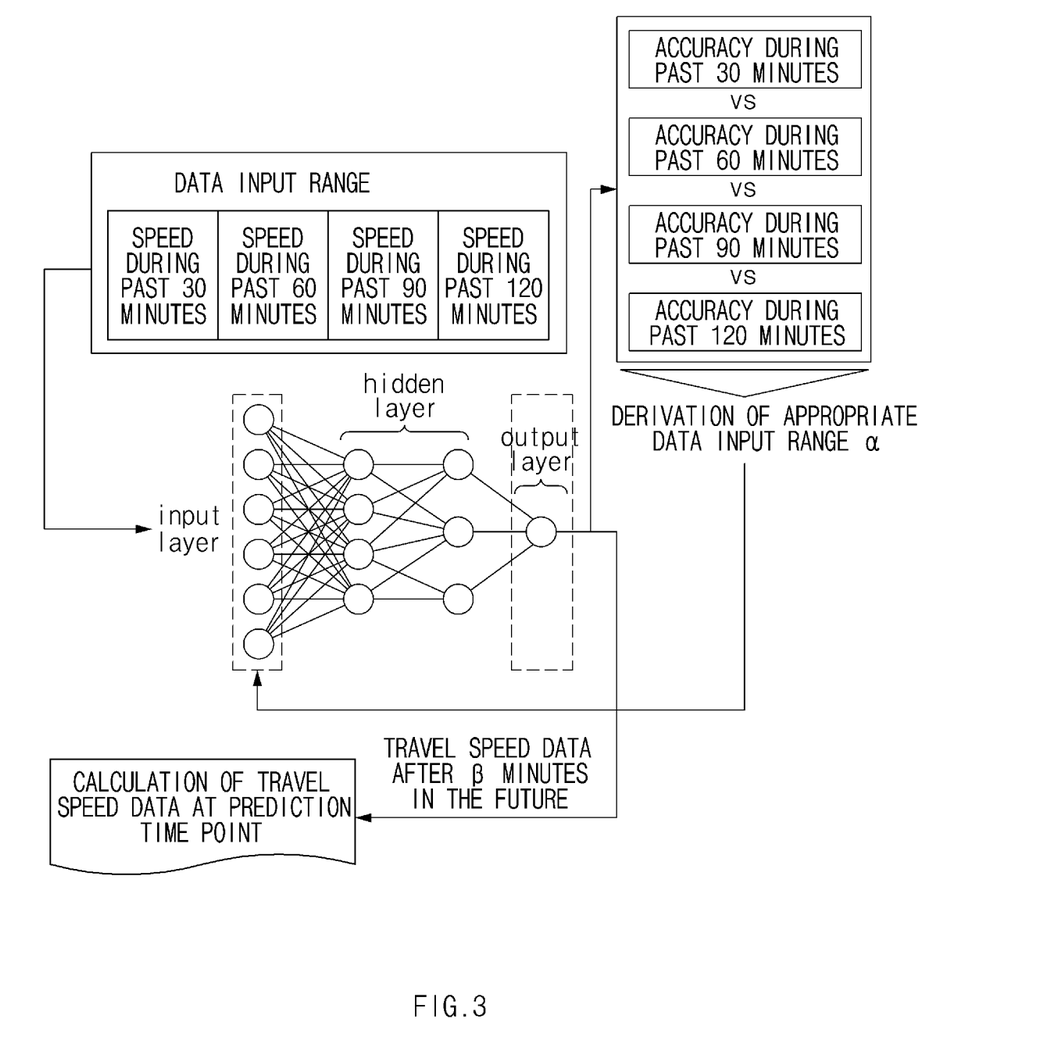
FIG. 3 is an exemplary diagram for describing traffic flow prediction according to an exemplary embodiment of the present disclosure.

FIG. 3 is an exemplary diagram for describing traffic flow prediction according to an exemplary embodiment of the present disclosure; The processor 160 may be configured to input a past traffic data set (e.g., sample data set) for each data input range into the input layer of the prediction model. The data input range may be set in advance as a time interval from the present time point (e.g., reference time point) to a specific time point in the past. The processor 160 may use travel speed data (speed) sets during the past 30 minutes, the past 60 minutes, the past 90 minutes, and the past 120 minutes with respect to the present time point, as input data of the prediction model. The travel speed data may be a speed in a unit of a predetermined time (e.g., about 5 minutes), and when the data input range is the past 30 minutes, the travel speed data set may include six speed values.

The processor 160 may be configured to predict a travel speed at a specific future time point by analyzing the past traffic data set of each data input range using the prediction model. The processor 160 may be configured to calculate a relative difference between the predicted travel speed and the actually measured travel speed, and analyze a prediction accuracy for each data input range based on the calculated relative difference. In other words, the processor 160 may be configured to compare accuracies of the predicted travel speeds based on the travel speed data sets during the past 30 minutes, the past 60 minutes, the past 90 minutes, and the past 120 minutes, and derive the data input range of the data set with the highest prediction accuracy as an appropriate data input range "a". For example, when the prediction accuracy of the travel speed predicted based on the travel speed data set during the past 90 minutes is the highest, the processor 160 may be configured to determine the past 90 minutes as the appropriate data input range "$\alpha$".

When the appropriate data input range "$\alpha$" is determined, the processor 160 may be configured to extract past traffic data of the determined appropriate data input range "$\alpha$" from the traffic data DB 140. The processor 160 may be configured to predict a travel speed at a specific future time point (e.g., prediction time point) by analyzing past traffic data extracted using the prediction model. In other words, the processor 160 may be configured to predict a travel speed after "$\beta$" minutes based on the present time point.

Figure 4:
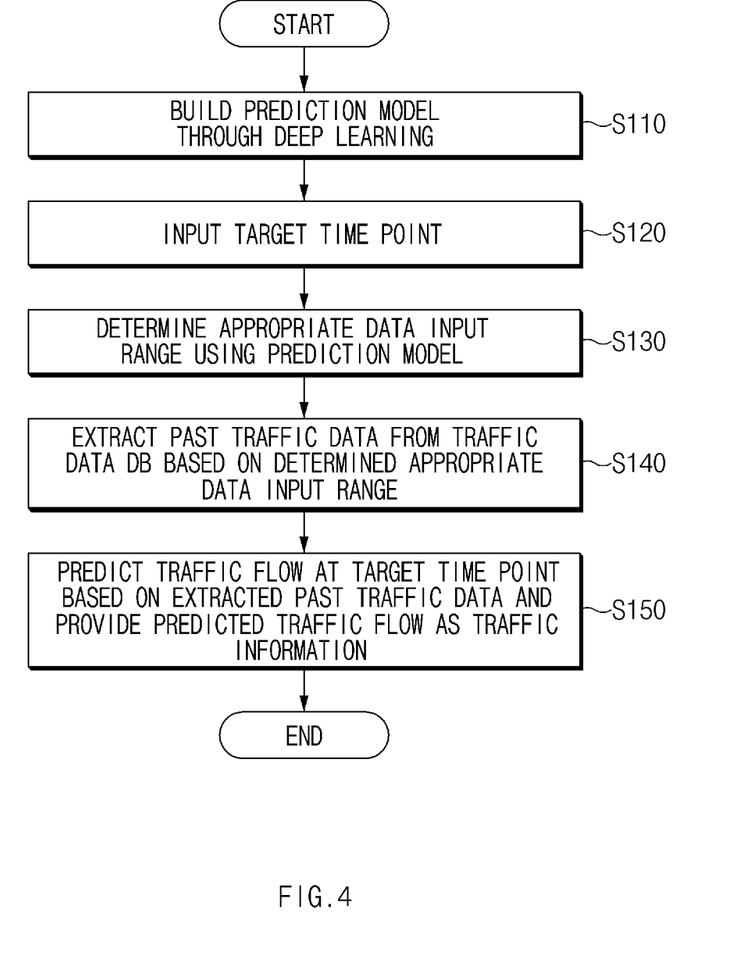
FIG. 4 is a flowchart illustrating a method of providing traffic information according to an exemplary embodiment of the present disclosure.

FIG. 4 is a flowchart illustrating a method of providing traffic information according to an exemplary embodiment of the present disclosure; Referring to FIG. 4, the processor 160 may be configured to build a prediction model for predicting a traffic flow through deep learning (S110). The processor 160 may be configured to generate a prediction model by training a regression model of a deep neural network structure.

After building the prediction model, the processor 160 may be configured to receive a future target time point (S120). The processor 160 may be configured to receive a target time point through the input device 110 or the communication device 130. In particular, the target time point may indicate a specific time point in the future based on the present time point. The processor 160 may be configured to receive input of a target road section together with the target time point.

Additionally, the processor 160 may be configured to determine an appropriate data input range for the target time point using the prediction model (S130). The processor 160 may be configured to predict a travel speed at the target time point by analyzing past speed data (sample data) for each data input range using the prediction model. The processor 160 may be configured to analyze prediction accuracies for data input ranges by calculating an error between the predicted travel speed and the actually measured travel speed (actual travel speed). The processor 160 may be configured to determine an appropriate data input range based on a result of the prediction accuracy analysis.

Further, the processor 160 may be configured to extract past traffic data from the traffic data DB 140 based on the determined appropriate data input range (S140). The processor 160 may be configured to predict a traffic flow at a target time point based on the extracted past traffic data and provide the traffic flow as traffic information (S150). The processor 160 may be configured to predict a travel speed, that is, a traffic flow, at a target time point based on the extracted past traffic data. The processor 160 may then be configured to provide the predicted traffic flow to the user as traffic information. For example, the processor 160 may be configured to output the predicted traffic flow to the output device 120. In addition, the processor 160 may be configured to transmit the predicted traffic flow to, for example, a user terminal, a vehicle terminal, and/or a roadside display device through the communication device 130.

Figure 5:
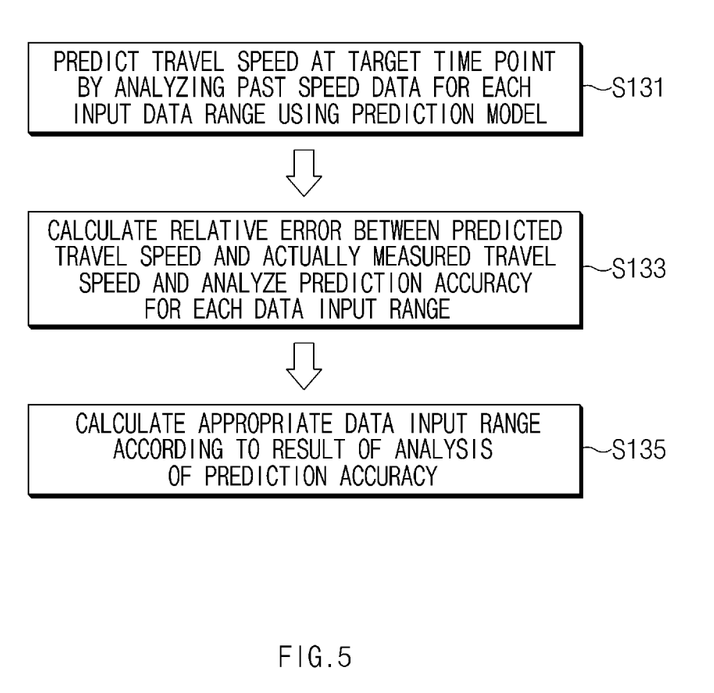
FIG. 5 is a flowchart illustrating a method of determining an appropriate data input range shown in FIG. 4 according to an exemplary embodiment of the present disclosure.

FIG. 5 is a flowchart illustrating a method of determining an appropriate data input range shown in FIG. 4; and Referring to FIG. 5, the processor 160 may be configured to predict a travel speed at a target time point by analyzing past speed data for each input data range using a prediction model (S131). The processor 160 may be configured to predict a travel speed at the target time point based on the input range (use range) of past traffic data based on a deep learning model. In particular, the past traffic data may be traffic speed data at a past time point based on the present time point.

The processor 160 may be configured to analyze a prediction accuracy for each data input range by calculating a relative error between the predicted travel speed and the measured travel speed (S133). The processor 160 may be configured to calculate the relative error of the prediction result by using an MRE function. In addition, the processor 160 may be configured to determine the prediction accuracy based on the calculated relative error. The processor 160 may be configured to calculate an appropriate data input range based on a result of the prediction accuracy analysis (S135). The processor 160 may be configured to determine an input data range having the highest prediction accuracy as an appropriate data input range.

FIGS. 6 to 9 are graphs showing results of prediction accuracy analysis for each prediction point according to a change in a data input range according to an exemplary embodiment of the present disclosure. In particular, "$\alpha$" is a data input range (use range), and is the past 30 minutes, the past 60 minutes, the past 90 minutes, and the past 120 minutes with respect to a specific time point, and "$\beta$" is a prediction time point, that is, a target time point in the future, for example, a time point after 0 minutes, a time point after 30 minutes, a time point after 60 minutes, a time point after 90 minutes or a time point after 120 minutes from a specific time point Notably, the present disclosure is not limited to these time periods.

Figure 6:
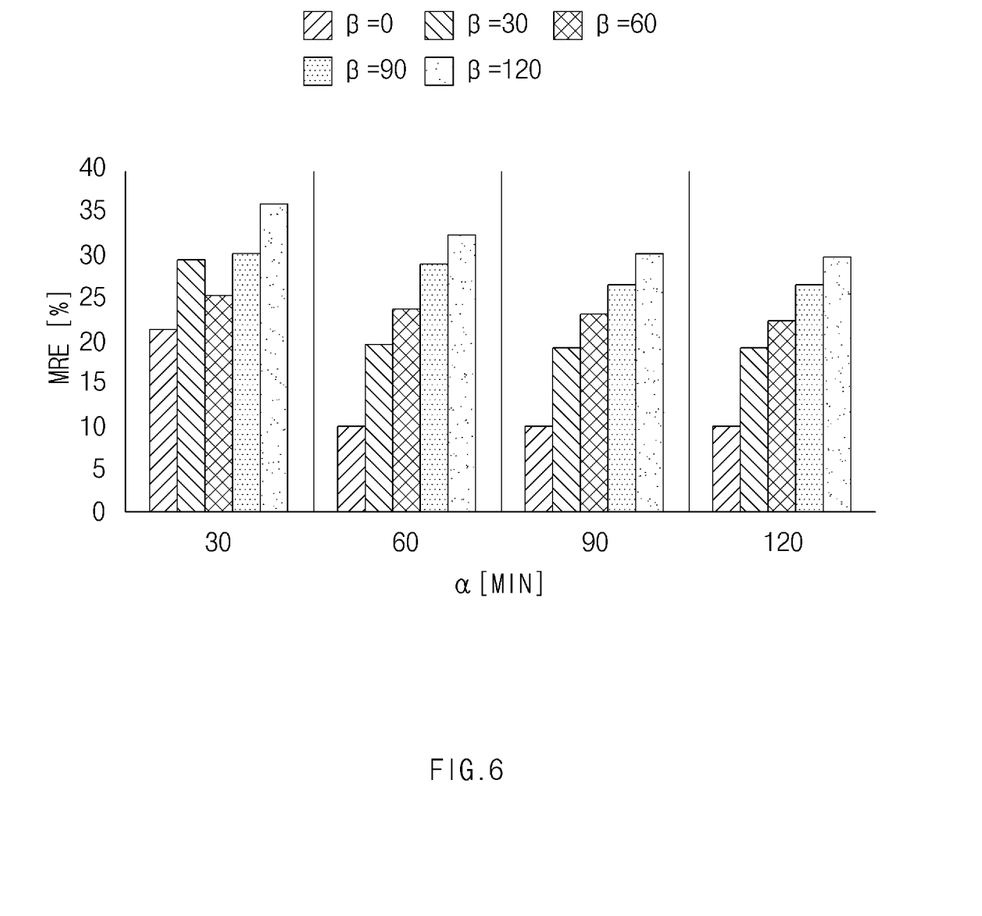
FIGS. 6 to 9 are graphs showing results of prediction accuracy analysis for each prediction point according to a change in a data input range according to an exemplary embodiment of the present disclosure.

Referring to FIG. 6, in the case of a first road section, as the input range of past traffic data increases, a relative error (MRE) may decrease. However, when the prediction time point is a time point after 30 minutes later, the relative error of a prediction result based on the past traffic data during the past 30 minutes may be slightly higher and therefore, it is necessary to collect past traffic data during at least 60 minutes or more.

Figure 7:
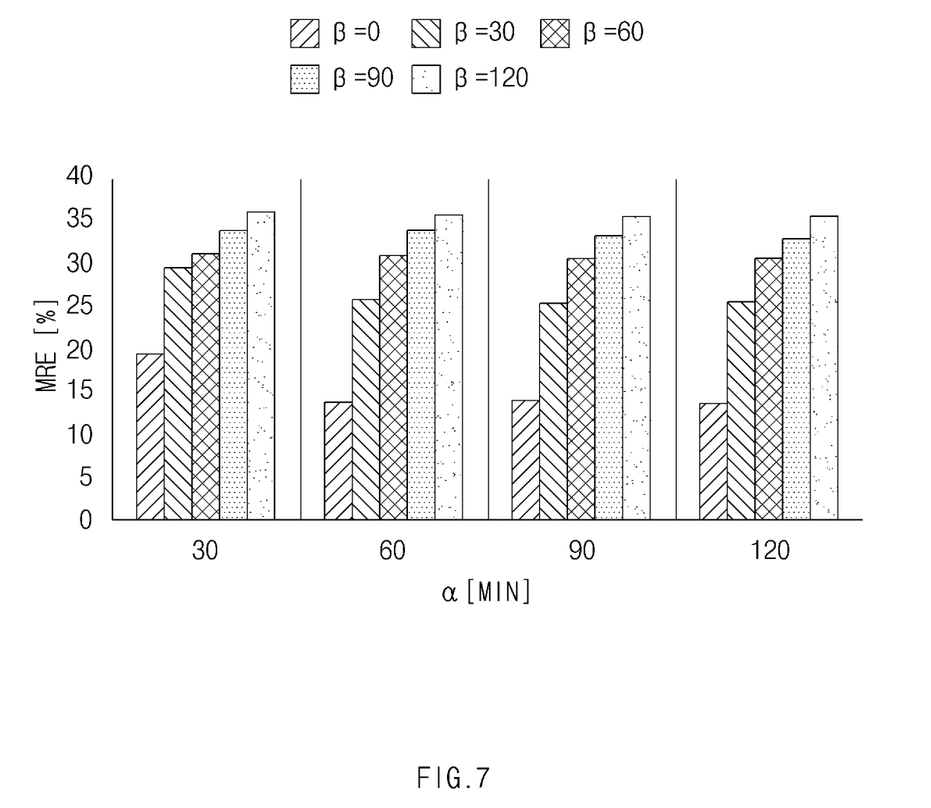

Referring to FIG. 7, in the case of a second road section, a difference in the relative error of the prediction result according to an input range of past traffic data is not large. However, when the prediction time point is a time point after 0 minutes and a time point after 30 minutes, the relative error may decrease when the input range of the past data is an input range of past 60 minutes or more, and therefore, it may be necessary to collect past traffic data for at least 60 minutes or more.

Figure 8:
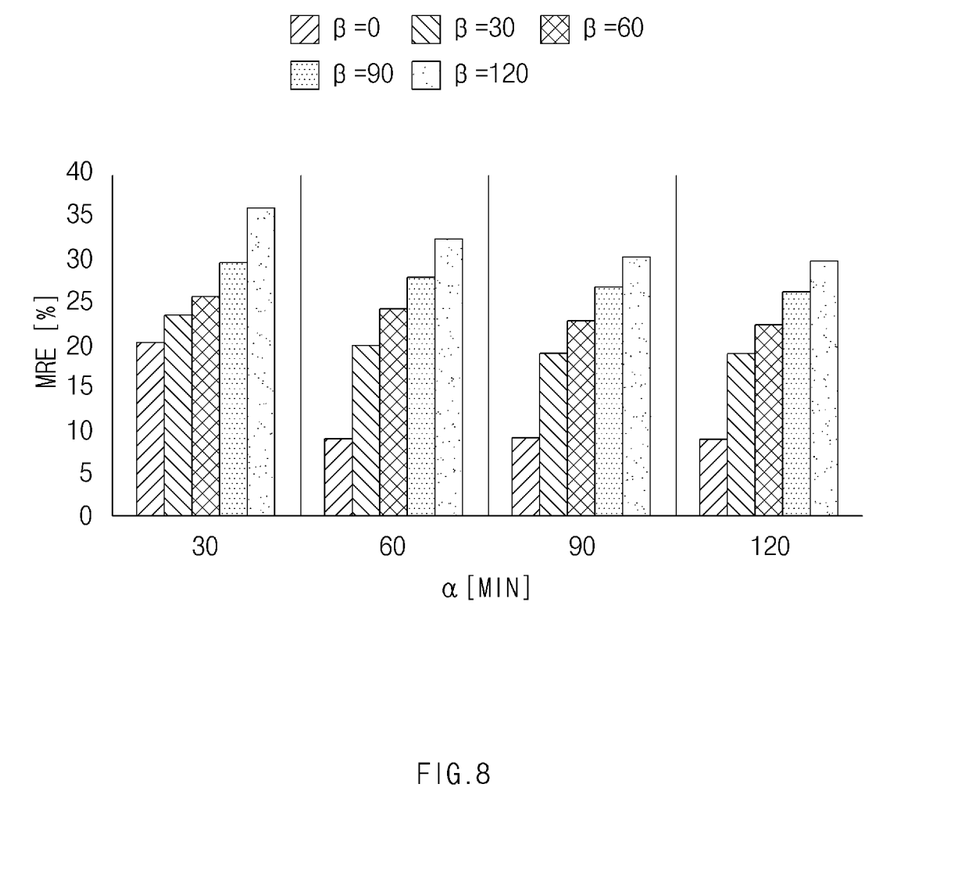

Referring to FIG. 8, in the case of a third road section, it was derived that the relative error of the prediction result decreases as the input range of past traffic data increases. In particular, when the prediction time point is a time point of 0 minutes, the relative error of the prediction result based on the past traffic data during the past 30 minutes is somewhat high and therefore, it may be necessary to collect the past traffic data for at least past 60 minutes or more.

Figure 9:
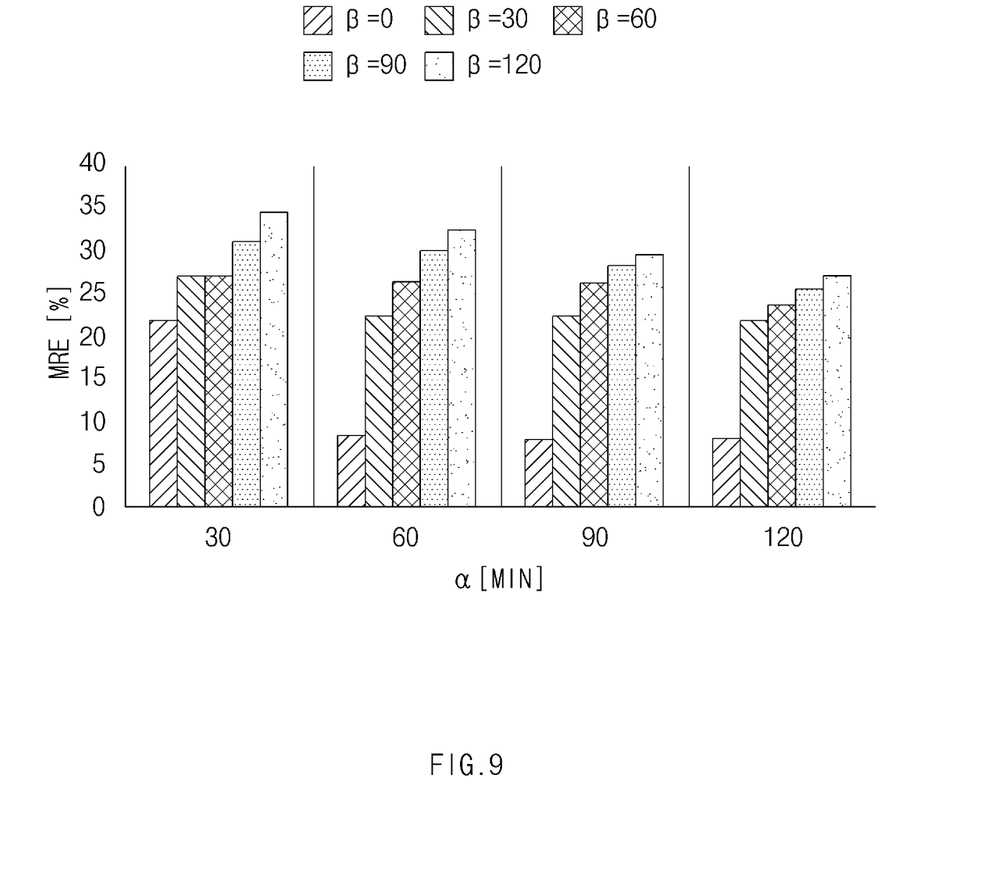

Referring to FIG. 9, in the case of a fourth road section, when an input range of past data is a range of past 120 minutes, it was found that prediction accuracy for most prediction time points is improved. On the other hand, the relative error of the prediction result decreases when predicting the prediction result after 0 minutes, that is, based on the past traffic data of the past 60 minutes or more, it is necessary to collect the past traffic data of 60 minutes or more.

The above description is merely illustrative of the technical idea of the present disclosure, and various modifications and variations may be made without departing from the essential characteristics of the present disclosure by those skilled in the art to which the present disclosure pertains. Accordingly, the exemplary embodiment disclosed in the present invention is not intended to limit the technical idea of the present invention but to describe the present invention, and the scope of the technical idea of the present invention is not limited by the exemplary embodiment. The scope of protection of the present disclosure should be interpreted by the following claims, and all technical ideas within the scope equivalent thereto should be construed as being included in the scope of the present disclosure.

According to the present disclosure, it may be possible to determine a data range to be used using a deep learning-based prediction model and predicting and providing traffic information at a future time point using past traffic data of the determined data range, thus improving a traffic information prediction accuracy. Further, according to the present disclosure, the data range to be used may be determined according to a future time point and/or a road section, thus improving efficiency in terms of system cost and time, such as a computation speed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for providing traffic information, comprising:
a non-transitory storage medium configured to store a prediction model for predicting a traffic flow;
a traffic data database (DB) configured to store traffic data; and
a processor connected to the traffic data DB,
wherein the processor is configured to:
receive a target time point in the future from an input device;
determine a data input range for the target time point in the future using the prediction model by:
receiving past travel speed data for a plurality of prospective data input ranges;
predicting a travel speed at the target time point for each of the plurality of prospective data input ranges using the prediction model;
calculating, for each prospective data input range, a relative error amount between each predicted travel speed and an actual measured travel speed; and
determining the data input range to be the prospective data input range of the plurality of prospective data input ranges having the smallest relative error amount;
extract past traffic data from the traffic data DB based on the determined data input range;
predict the traffic flow at the target time point based on the extracted past traffic data; and
output the traffic flow to an output device as the traffic information.

2. The apparatus of claim 1, wherein the processor is further configured to build the prediction model by training a regression model of a deep neural network (DNN) structure.

3. The apparatus of claim 1, wherein the traffic data DB includes pieces of travel speed data for each time point and each road section which are measured in the past with respect to a present time point.

4. The apparatus of claim 1, wherein the processor is further configured to further consider external environment information when the traffic flow is predicted.

5. The apparatus of claim 1, wherein each of the prospective data input ranges is set in advance to a time interval from a reference time point to a specific time point in the past.

6. The apparatus of claim 1, wherein the processor is further configured to subdivide a road section according to spatial characteristics and calculate an data input range for each road section.

7. A method for providing traffic information, comprising:
receiving, by a processor, a target time point in the future from an input device;
determining, by the processor, a data input range for the target time point in the future using a prediction model for predicting a traffic flow stored in a non-transitory storage medium by:
receiving past travel speed data for a plurality of prospective data input ranges;
predicting a travel speed at the target time point for each of the plurality of prospective data input ranges using the prediction model;

calculating, for each prospective data input range, a relative error amount between each predicted travel speed and an actual measured travel speed; and determining the data input range to be the prospective data input data input range of the plurality of prospective data input ranges having the smallest relative error amount;

extracting, by the processor, past traffic data from a traffic data database (DB) based on the determined data input range;

predicting, by the processor, the traffic flow at the target time point based on the extracted past traffic data; and outputting, by the processor, the traffic flow to an output device as the traffic information.

8. The method of claim 7, wherein the prediction model is built by training a regression model of a deep neural network (DNN) structure.

9. The method of claim 7, wherein the outputting of the traffic information includes predicting the traffic flow in consideration of external environment information.

10. The method of claim 7, wherein each of the prospective data input ranges is set in advance to a time interval from a reference time point to a specific time point in the past.

11. The method of claim 7, wherein the calculating of the data input range includes subdividing a road section according to spatial characteristics and calculating a data input range for each road section.

* * * * *